United States Patent
Watanabe

(10) Patent No.: US 7,876,470 B2
(45) Date of Patent: Jan. 25, 2011

(54) PRINTING METHOD, PRINTING CONTROL APPARATUS, PRINTING APPARATUS, AND CONTROL METHOD THEREFOR

(75) Inventor: Tomoyuki Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1207 days.

(21) Appl. No.: 10/975,420

(22) Filed: Oct. 29, 2004

(65) Prior Publication Data
US 2005/0094846 A1 May 5, 2005

(30) Foreign Application Priority Data
Oct. 31, 2003 (JP) ............................. 2003-373183
Sep. 21, 2004 (JP) ............................. 2004-273974

(51) Int. Cl.
G06K 15/00 (2006.01)
H04N 1/387 (2006.01)
G06F 3/12 (2006.01)

(52) U.S. Cl. ...................... 358/1.18; 358/1.1; 358/1.14; 358/1.15

(58) Field of Classification Search ................. 358/1.1, 358/1.18, 1.14, 1.15
See application file for complete search history.

(56) References Cited

U.S. PATENT DOCUMENTS 4,631,596 A * 12/1986 Yaguchi ..................... 358/449
5,428,459 A    6/1995 Asai ........................... 358/449
2003/0182629 A1* 9/2003 Okamura .................... 715/525

FOREIGN PATENT DOCUMENTS

| JP | 11-15749    | 1/1999 |
| JP | 11-053467   | 2/1999 |
| JP | 2000-25297  | 1/2000 |
| JP | 2003-54065  | 2/2003 |

OTHER PUBLICATIONS

Office Action, dated Nov. 17, 2008, in JP 2004-273974.
Office Action, dated Apr. 17, 2009, in JP 2004-273974.

* cited by examiner

*Primary Examiner*—King Y Poon
*Assistant Examiner*—Lawrence E Wills
(74) *Attorney, Agent, or Firm*—Fitzpatrick, Cella, Harper & Scinto

(57) ABSTRACT

It is an object of this invention to provide a user-legible print result in consecutively printing a plurality of pages of images. To this end, it is checked whether there is continuity between data to be printed at the lower end portion of a page and data to be printed at the upper end portion of the next page. If there is continuity, a page break is inserted before the data at the lower end portion of the page, and an image of the data at the lower end portion is printed on the next page. Controlling a printing method in this manner makes it possible to prevent character split due to printing across pages and provide a user-legible print result.

5 Claims, 17 Drawing Sheets

LINE SPACING RECOGNITION

FIG. 9

| COUNT OF NULL RASTERS | COUNT OF FREQUENCIES | |
|---|---|---|
| 10 LINES | 1 | |
| 11 LINES | 4 | ------- LINE SPACING |
| 12 LINES | 5 | ------- LINE SPACING |
| 13 LINES | 6 | ------- LINE SPACING (REFERENCE LINE) |
| 14 LINES | 1 | |
| 15 LINES | 1 | |
| 40 LINES | 1 | |

LINE SPACING CHECK AMOUNT TABLE

PRINTING METHOD, PRINTING CONTROL APPARATUS, PRINTING APPARATUS, AND CONTROL METHOD THEREFOR

FIELD OF THE INVENTION

The present invention relates to a printing control apparatus connected to a printer, printing apparatus, control method for the apparatuses, control program, and storage medium and, more particularly, to a printing method, printing control apparatus, control method for the apparatuses, control program, and storage medium which provide a legible print result to the user in consecutively printing a plurality of pages of images using a printing control apparatus which does not have a browser function but includes a printer driver and the like.

BACKGROUND OF THE INVENTION

There have recently been prevailing portable terminals and set-top boxes which enable utilization of the Internet or email without any computer such as a personal computer or the like. A set-top box means a device which is connected to a television and provides various services. This device incorporates a browser software application which analyzes HTML data to execute rasterization and display, email application, character data, and the like. The user can use these functions through a display device such a CRT or television display, and even a general user unskilled in personal computers can be provided with an Internet environment. When a printer is connected to the device, an Internet homepage or email data can be printed, and printing can be executed in various installed applications. However, in printing in the above-mentioned system, a page break is sometimes inserted in the middle of character data, and characters may be printed across two pages. Data such as a homepage or email is not bound by the conception of page, and how to rasterize data on a page depends on an application such as a browser in the device. Some browsers insert a page break in the middle of character data. As a result, characters may be printed across two pages, and the output result may become hard for the user to see.

As a means for solving the problem, for example, there is disclosed Japanese Patent Laid-Open No. 11-15749. In this example, source data before rasterization such as HTML data or the like is analyzed and undergoes rasterization after new HTML data with a changed layout is created. Thus, it is impossible to implement the solution in a printer driver or the like which has no HTML data analysis and generation functions.

SUMMARY OF THE INVENTION

The present invention has been made to solve the above-mentioned conventional drawbacks, and has as its object to provide a printing method, printing control apparatus, printing apparatus, and control method for the apparatuses which generate a legible print result to the user in consecutively printing a plurality of pages of images using a printing control apparatus which does not have a browser function but includes a printer driver and the like. For this reason, according to the present invention, in inter-page data which records a continuous image, continuity between data to be printed at the bottom of a page and data to be printed at the top of the next page is checked by determining whether a null line is present or not, whether a line spacing is present between character lines or not, and whether the bottom of a printable area is present or not. If there is continuity between the data, a page break is inserted before the data at the bottom of the page, and an image of the data at the bottom is printed on the next page. By controlling a printing method in this manner, character split due to printing across pages can be prevented. Thus, a legible print result can be provided to the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows an example of a line spacing check amount table;

DETAILED DESCRIPTION OF THE PREFERRED EMBODIMENTS

Preferred embodiments of the present invention will now be described in detail in accordance with the accompanying drawings.

The outline of a printing control apparatus according to the present invention will be described first.

The printing control apparatus is connected to a printer to control printing of the printer. The printing control apparatus does not have a browser function but has a printer driver which converts data to be printed into data specific to the printer. The printer driver executes color conversion, quantization, and the like for the data to be printed and sends the processed data to the printer. Note that the data to be printed is rasterized by system software which calls the printer driver and is passed to the printer driver. Font data are not preinstalled in the printer. The printing control apparatus may be integrated with a printer into a printing apparatus.

Figure 1:
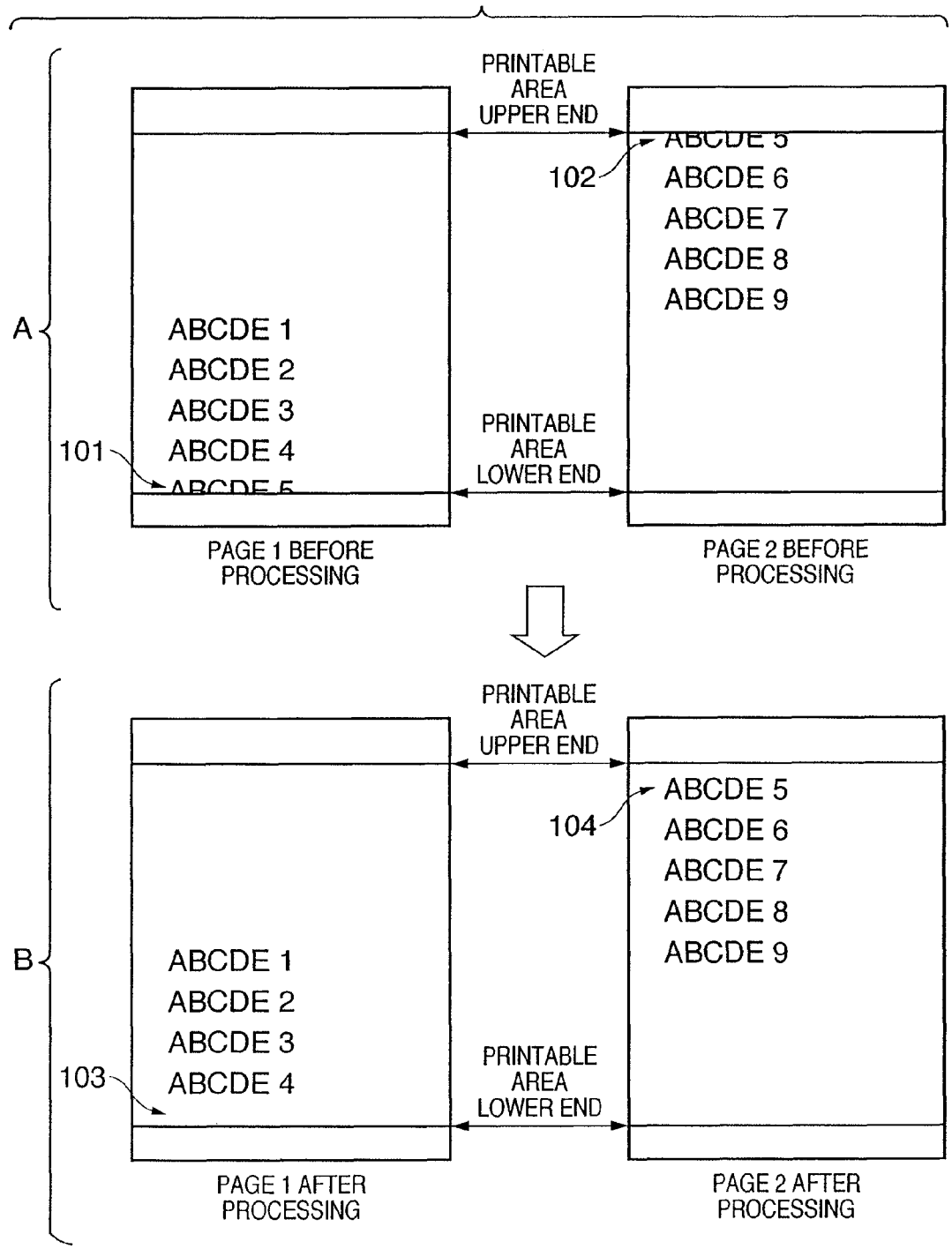
FIG. 1 is a view for explaining character split processing of a printing control apparatus according to the present invention.

[Processing of Printing Control Apparatus: FIG. 1]

FIG. 1 is a view for explaining an example of printer control processing to be executed using a printing control apparatus according to an embodiment of the present invention. Page 1 before processing and page 2 before processing shown in a portion A of FIG. 1 have not yet undergone processing according to the present invention. As for an image across two consecutive pages output from a printer, character split occurs across the pages at positions represented by reference numerals 101 and 102. Page 1 after processing and page 2 after processing shown in a portion B of FIG. 1 have undergone the processing according to the present invention. As for an image across two consecutive pages output from the printer, no character split occurs across the pages at positions represented by reference numerals 103 and 104. In the latter case, character split is eliminated.

The printing control apparatus has the following means to execute the above-mentioned processing. More specifically, the printing control apparatus has a means for determining whether each raster line passed from a system to a printer driver is a null raster line (NULL raster line, information indicating a NULL raster line, or the like). The printing control apparatus also has a means for spooling, out of raster lines passed from the system to the printer driver, a plurality of raster lines including the upper end portion of each page and a plurality of raster lines including the lower end portion. A storage means according to the embodiment stores consecutive raster lines other than a null raster line. The spooling is stopped when a null raster line is recognized. With this processing, the top raster line through the first null raster line are spooled at the upper end portion of each page while the last null raster line through the bottom raster line are spooled at the lower end portion. If the top or bottom raster line is a null raster line, spooling is skipped. The printing control apparatus further has a null raster line count means for counting consecutive null raster lines in all raster lines. The null raster line count means stops the processing when it recognizes a raster line other than a null raster line, and stores the count of raster lines at this time. If a count of raster lines equal to the count is already stored, a count of occurrences of the count of raster lines is increased, thereby grasping the frequency with which a given number of null raster lines occur.

When data to be printed is an email text or the like, it has line spacings. This plurality of line spacings are highly likely to be equal to each other, and each interlinear data comprises a null raster line. From this, the printing control apparatus can grasp whether consecutive null raster lines constitute a line spacing in the data to be printed. However, a null raster line may be caused by a white image or the like. The line spacing grasp ratio can be increased by checking the frequency of occurrence.

The above-mentioned means are prepared. When the bottom raster line of a page becomes a raster to be processed at the time of printing, a count of the last null raster lines is obtained. It is determined whether the count of raster lines is close to a count of raster lines whose frequency of occurrence is the highest, out of counts of raster lines whose frequencies of occurrence have been grasped. If YES, the last null raster lines are recognized as a line spacing. The same processing is executed at the upper end portion of the next page, i.e., it is determined whether the first consecutive null raster lines constitute a line spacing.

For example, assume that the last null raster lines immediately before the lower end constitute a line spacing, and the upper end of the next page is followed by the first null raster lines (they may or may not constitute a line spacing). In this case, the lower end portion and the upper end portion of the next page are recognized as continuous data. A page break is inserted before outputting spooled data of the lower end portion of the page, and the data of the lower end portion is output as the top data of the next page. With this processing, an image which is to be printed across two pages under normal conditions is printed at the top portion of the next page, and character split due to a page break can be prevented. This is effective not in, e.g., printing one page by removing null lines within the page but in printing data such as a web page whose layout designed by a creator is heavily weighed.

The printing control apparatus also has a means for comparing corresponding pixel data between the bottom raster of the page and the top raster of the next page. Applying the means to the above-mentioned processing can increase the recognition ratio of character split. The printing control apparatus having the above-mentioned means can reduce character split due to a page break and can generate a legible print result to the user.

Figure 2:
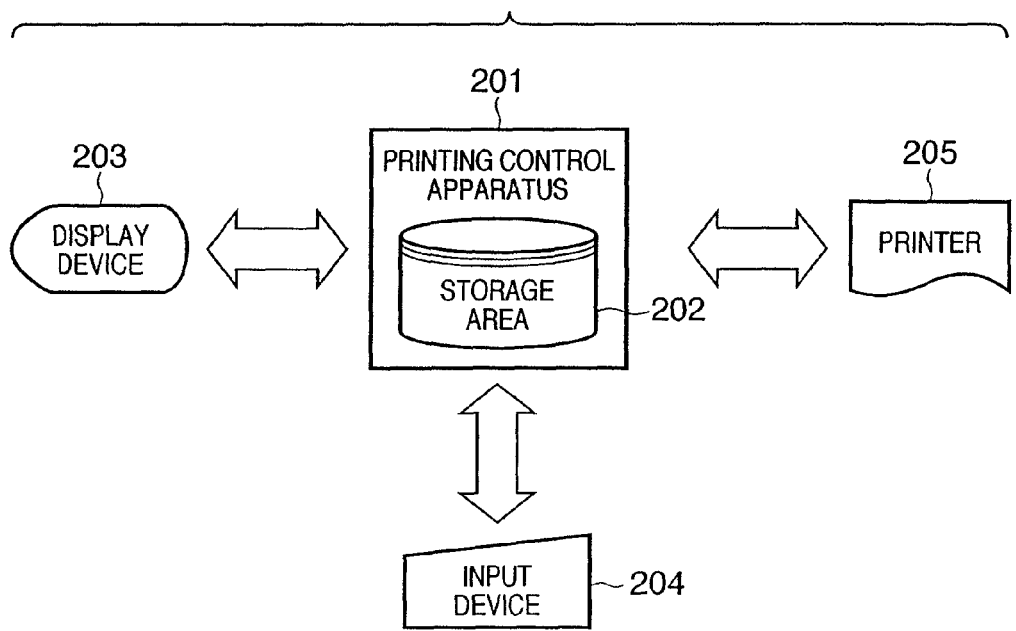
FIG. 2 is a diagram of the overall arrangement of the printing control apparatus according to the present invention.

[Printing Control Apparatus: FIG. 2]

FIG. 2 is a block diagram showing the overall arrangement of hardware in which the printing control apparatus according to the embodiment of the present invention operates. The printing control apparatus according to the embodiment of the present invention has a hardware arrangement which comprises a printing control apparatus 201 with a printer driver including a function according to the present invention (to be described later), a storage area 202, a display device 203, an input device 204, and a printer 205. Note that FIG. 2 shows a mere example, and a system in which the printing control apparatus or printing apparatus comprises a plurality of devices such as a printing processing apparatus (host computer) which executes printer printing control, a printer, and the like may be adopted instead.

Figure 3A:
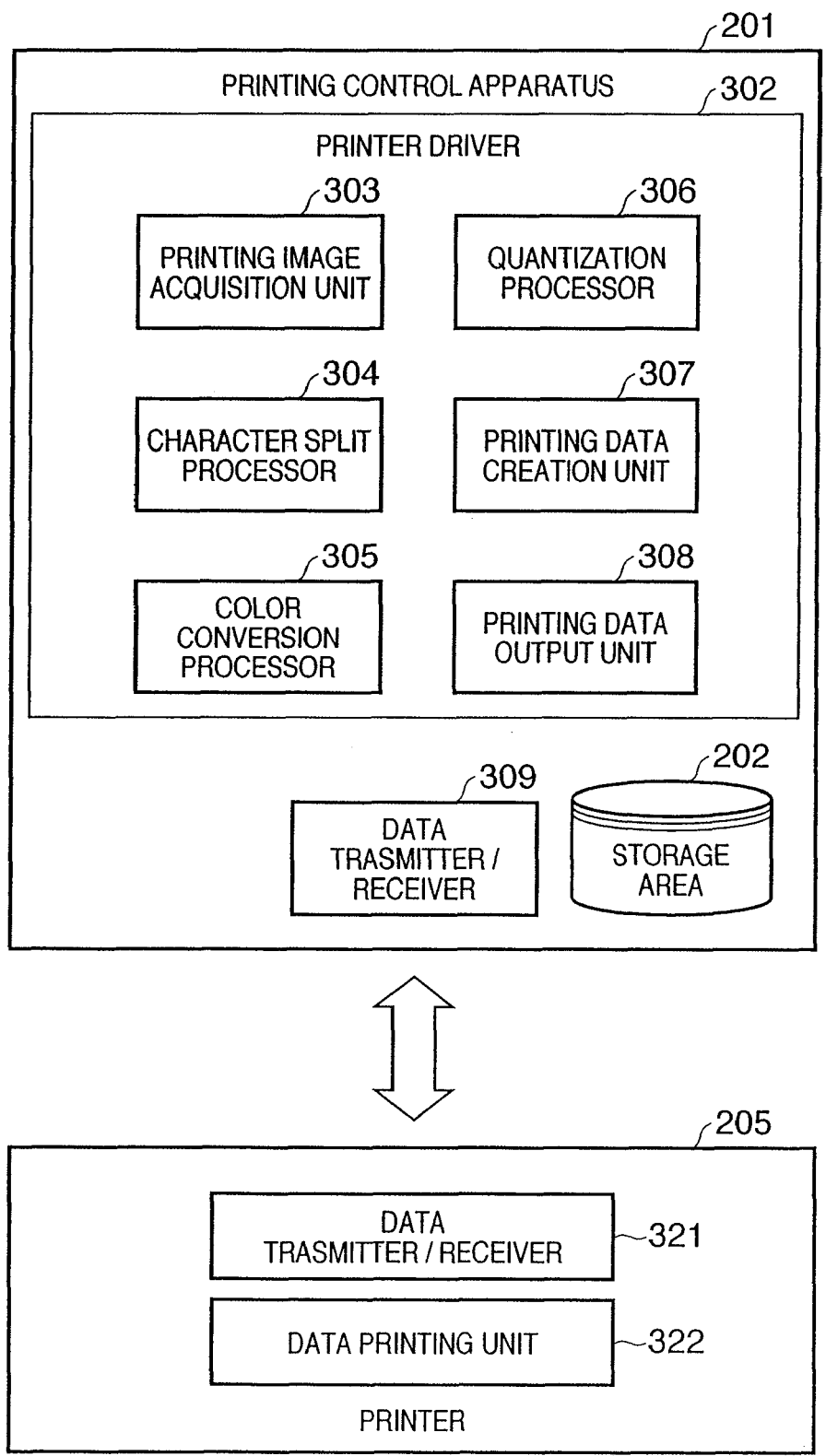
FIG. 3A is a functional block diagram for explaining the internal arrangement of the printing control apparatus according to the present invention.
Figure 3B:
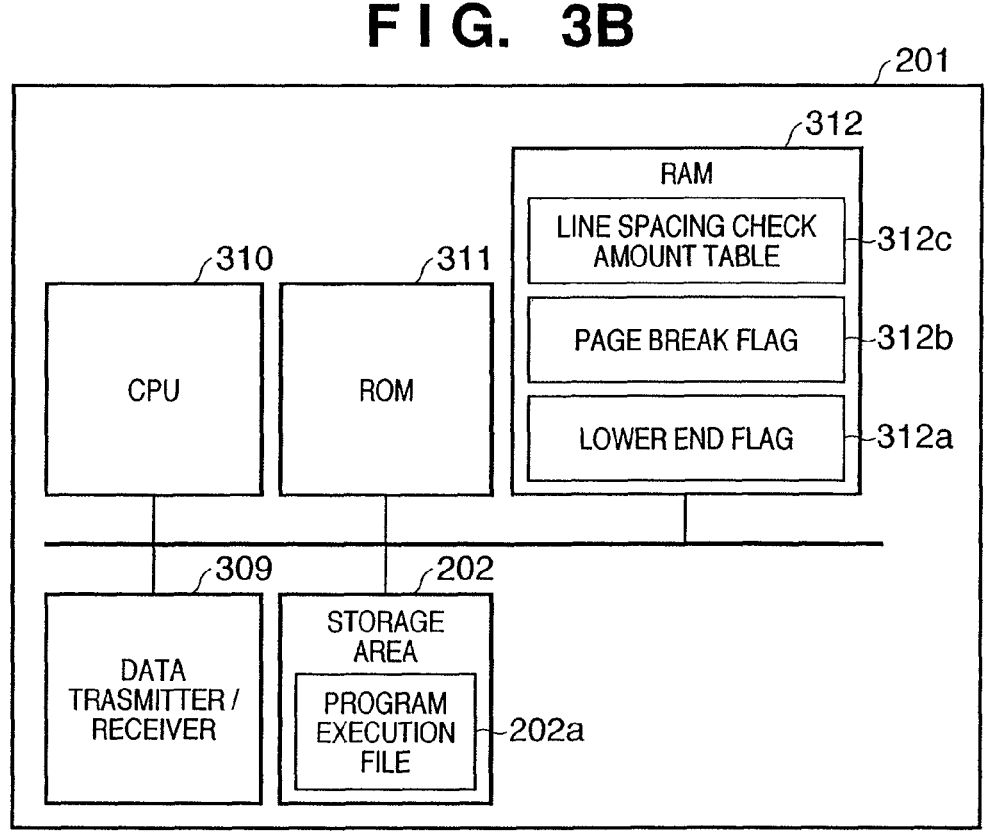
FIG. 3B is a block diagram for explaining the internal arrangement of the printing control apparatus according to the present invention.

[Internal Arrangement of Printing Control Apparatus: FIGS. 3A and 3B]

FIG. 3A is a functional block diagram for explaining the internal arrangement of the printing control apparatus and printer in FIG. 2. The printing control apparatus 201 incorporates a printer driver 302, a data transmitter/receiver 309, the storage area 202, and the like. The printer driver 302 incorporates a printing image acquisition unit 303, character split processor 304, color conversion processor 305, quantization processor 306, printing data creation unit 307, and printing data output unit 308. A printer 320 incorporates a data transmitter/receiver 321, data printing unit 322, and the like.

FIG. 3B is a block diagram showing the hardware arrangement for implementing the function shown in FIG. 3A. The printing control apparatus 201 incorporates a CPU 310, a ROM 311, a RAM 312, the data transmitter/receiver 309, the storage area 202, and the like. The CPU 310 controls the entire printing control apparatus. The ROM 311 stores various kinds of data such as control programs for controlling the CPU 310, including a program which implements the processing of a flowchart (to be described later), fonts, and the like. The RAM 312 serves as a work memory of the CPU 310 or temporarily stores input data. The printing control apparatus 201 and printer 205 are connected to each other through a bidirectional interface such as a USB interface, parallel interface, network, or the like. The data transmitter/receiver 309 transmits/receives data or the like to/from the printer 205. The storage area 202 comprises a memory of, e.g., a hard disk and can store various kinds of data such as the control program of the CPU 310, fonts, and the like. The printer 205 incorporates the data transmitter/receiver 321, the data printing unit 322, a CPU 323, a ROM 324, a RAM 325, and the like. The CPU 323 controls the entire printer. The ROM 324 stores various kinds of control programs for controlling the CPU 324. The RAM 325 serves as a work memory of the CPU 323 or the like. A lower end flag 312a, page break flag 312b, line spacing check table 312c, and the like are stored in the RAM 325. The data transmitter/receiver 321 transmits/receives data to/from the printing control apparatus 201. The data printing unit 322 prints an image on the basis of received data. The lower end flag 312a is an internal flag indicating the bottom line immediately before a page break code which represents a page break. In the printing apparatus according to this embodiment, printing data is passed to the printer driver after system software rasterizes the printing data. For this reason, the system software or printer driver appropriately adds the page break flag 312b in accordance with a paper sheet size.

The above-mentioned arrangement will be described in detail. When printing starts, the printing image acquisition unit 303 first acquires image data to be printed. The character split processor 304 executes character split processing according to the present invention (to be described later) for the acquired data. The color conversion processor 305 executes color conversion into a color depending on the printer 205. The quantization processor 306 subjects the data having undergone color conversion to error diffusion processing or dithering, thereby quantizing the data into a form acceptable to the printer. After the quantized data is converted into printer printing data by the printing data creation unit 307, it passes through the printing data output unit 308 and is sent to the printer. The storage area 202 stores line spacing check amount data for character split processing (to be described later).

The data transmitter/receiver 321 in the printer 205 receives data sent from the data transmitter/receiver 309 in the printing control apparatus 201 and executes printing using the data printing unit 322. The details of the operation processing within the hardware of the printing control apparatus have been described.

[Processing of Character Split Processor]

Figure 4:
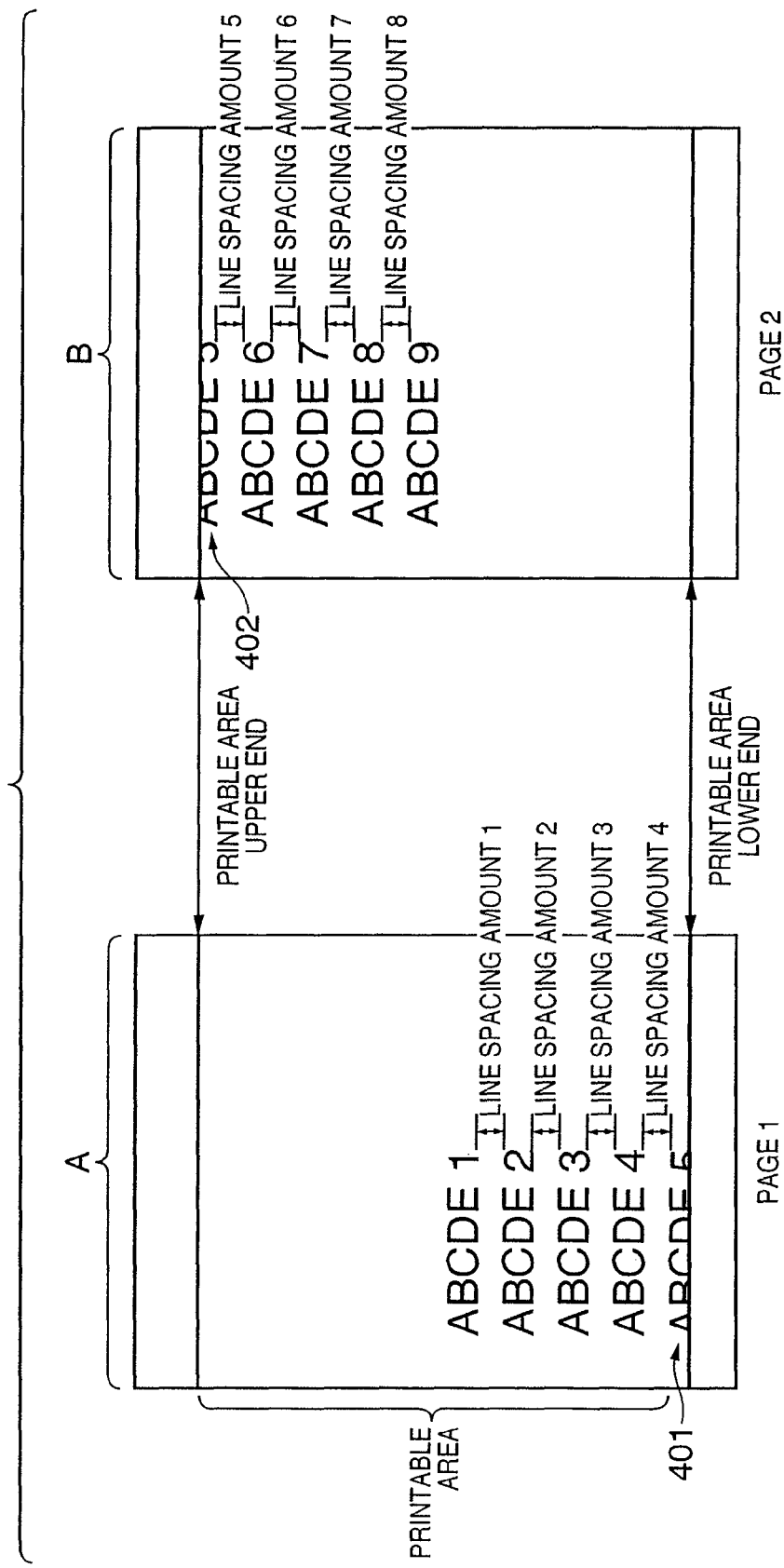
FIG. 4 is a view showing an example of a print result (character split) before the character split processing by the printing control apparatus according to the present invention.

The above-mentioned processing of the character split processor 304 in FIGS. 3A and 3B will be described in detail with reference to FIGS. 4, 5, 6A, and 6B. The character split processor 304 executes processing while the CPU 323 controls units on the basis of a control program (program execution file 202a) stored in the storage area 202, ROM 311, or the like. FIG. 4 shows an output result obtained without character split processing. There is a character string "ABCDE5" 401 at the lower end portion of page 1 in a portion A of FIG. 4. Since the almost lower half of the character data falls over the lower end of a printable area, the lower half is printed at a position 402 on the upper end portion of page 2.

Figure 5:
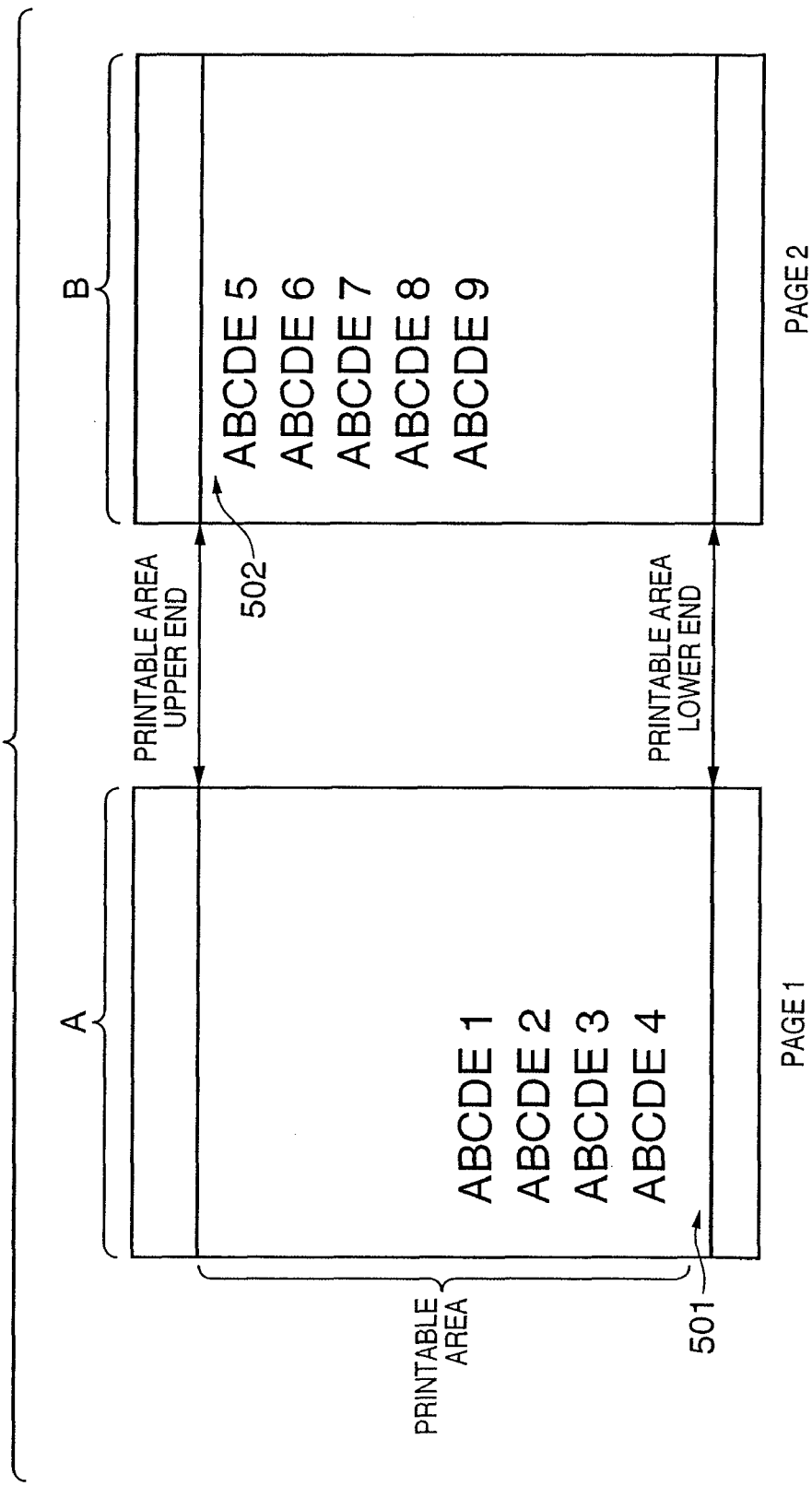
FIG. 5 is a view showing an example of a print result (elimination of character split) after the character split processing by the printing control apparatus according to the present invention.

FIG. 5 shows a result of character split processing by the character split processor 304 of the printing control apparatus. In FIG. 4, the character string "ABCDE5" 401 has fallen over the lower end of the printable area in the portion A. In FIG. 5, a character string "ABCDE5" having undergone character split processing is printed at a position 502 at the upper end portion of page 2 in a portion B of FIG. 5. As shown in a portion A of FIG. 5, character split is prevented at the lower end portion of page 1, and a legible result is provided to the user. As described above, in the character split processing, a page break is inserted before a portion which is to fall over the lower end of the printable area of a page, and the portion and subsequent data are printed on the next page. With this operation, character split can be avoided.

Figure 6A:
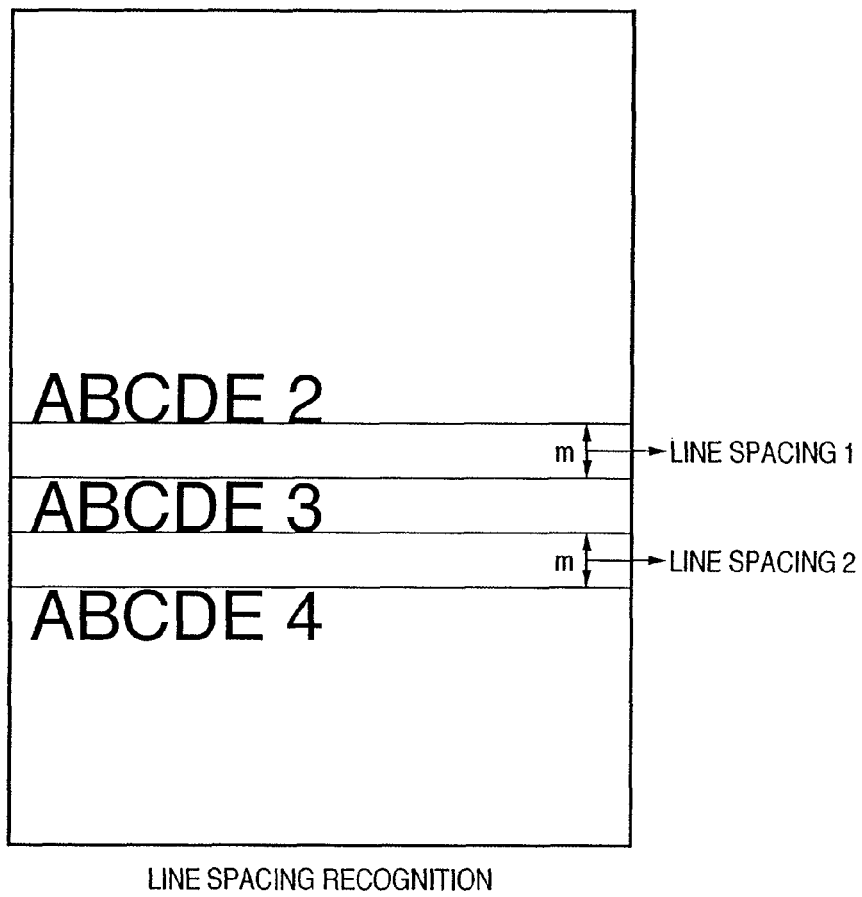
FIG. 6A is a view for explaining line spacing recognition.

FIG. 6A is an enlarged view of character stings on a page. Line spacings occur in character string data of email or the like laid out on a page and are almost equal to each other. For example, the amounts of a line spacing 1 and line spacing 2 shown in FIG. 6A (line spacing amounts m) are generally equal to each other. If a space (line spacing amount 4) between a character string "ABCDE4" and the character string "ABCDE5" in the portion A of FIG. 4 is equal to another line spacing amount such as a space (line spacing amount 1) between a character string "ABCDE1" and a character string "ABCDE2", the space (line spacing amount 4) can be determined as a line spacing. In page 2 shown in the portion B of FIG. 4, a space (line spacing amount 5) between the character string "ABCDE5" and a character string "ABCDE6" can also be determined as a line spacing. If character split occurs, no null line occurs because there is continuity between the bottom raster data (401) on the page and the top raster data (402) on the next page. By recognizing the two line spacings (line spacing amounts 4 and 5), data between the two line spacings (401 and 402) can be recognized as continuous data in which character split has occurred.

Figure 6B:
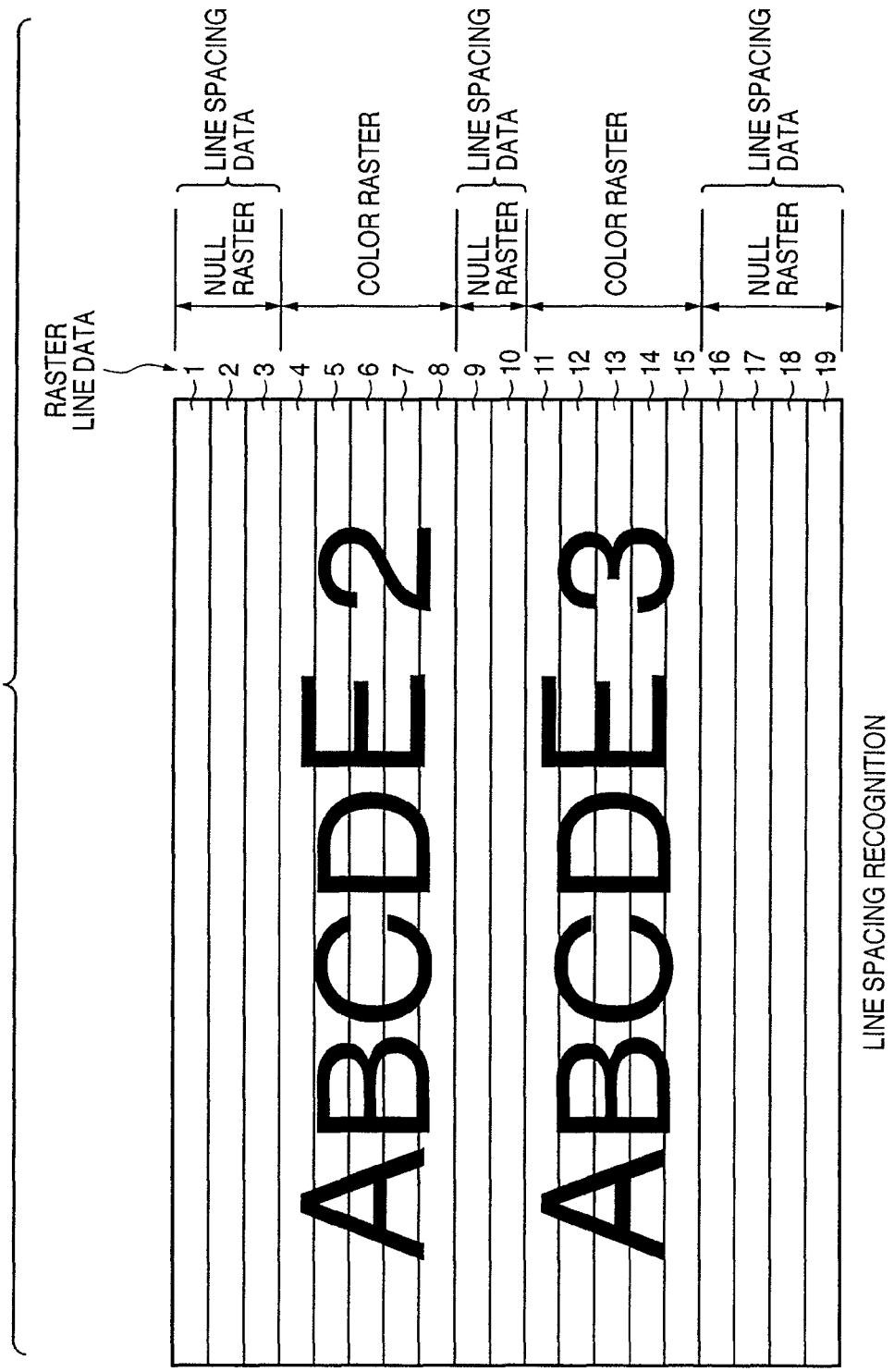
FIG. 6B is a view for explaining line spacing recognition.

[Line Spacing Value Recognition Method: FIG. 6B]

A line spacing value recognition method will be described with reference to FIG. 6B. Since data passed from the system is rasterized image data, a character string (like "ABCDE2") is divided into, e.g., a plurality of raster line data 4 to 8, as shown in FIG. 6B. As for each raster line data, some image data other than NULL is present on the raster line. Each line spacing data comprises a plurality of raster line data (e.g., 1 to 3, 9 to 10, and 16 to 19), as shown in FIG. 6B. Every raster comprises null raster line data (e.g., NULL raster line data).

For this reason, it is determined for each raster line data whether the entire line comprises NULL. If the entire line comprises NULL, the line can be recognized as a NULL raster line. Consecutive NULL raster lines can be recognized as a line spacing.

However, a white image whose actual data is NULL may constitute a NULL raster. For this reason, the count and frequency of occurrence of consecutive NULL rasters (if any) are accumulated from the upper end of page 1. A count of raster lines whose frequency of occurrence is the highest and counts of raster lines in its neighborhood (in consideration of a digital error in rasterization) are defined as a count of raster lines serving as a line spacing. This makes it possible to further increase the recognition ratio of line spacings. The character split processing by the character split processor 304 of the printing control apparatus has been described.

Figure 7:
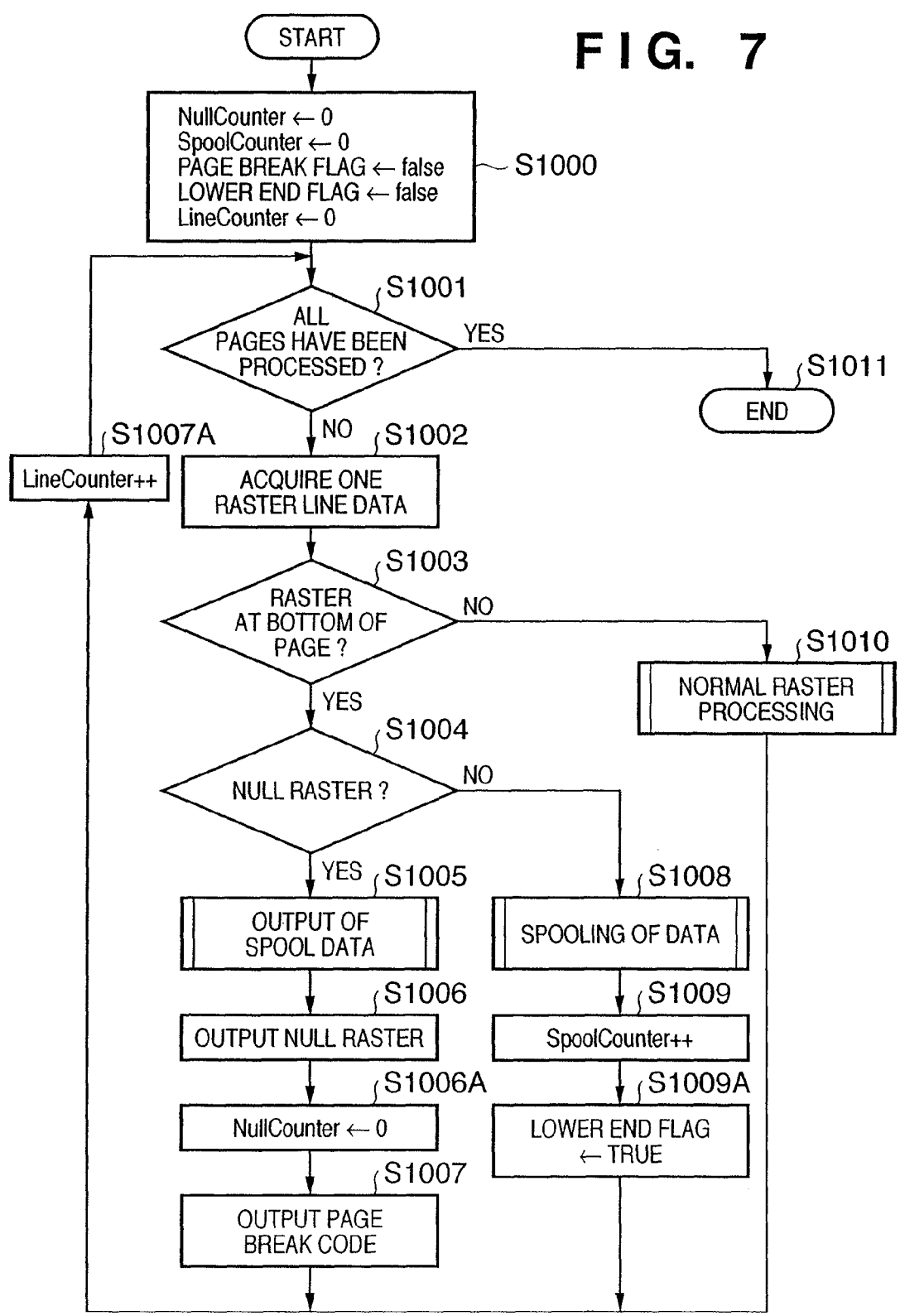
FIG. 7 is a flowchart showing the character split processing by the printing control apparatus according to the present invention.

[Character split Processing: FIG. 7]

Figure 3B:
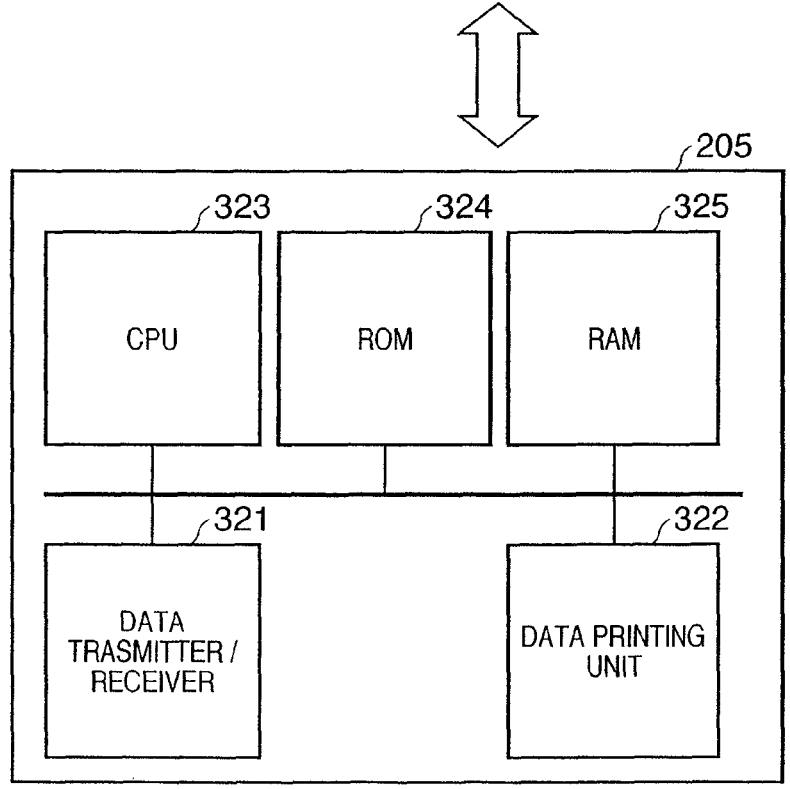

In the printing control apparatus according to the embodiment of the present invention having the above-mentioned arrangement, character split processing in the printer driver 302 of FIG. 3 will be described in detail with reference to FIG. 7 to 9.

In step S1000, initial values (Null Counter=0, Spool Counter=0, Line Counter=0, the page break flag=FALSE, and the lower end flag=FALSE) are set, and the flow advances to step S1001.

In step S1001, it is determined whether all pages have been processed. If all the pages have not been processed, the flow advances to step S1002 to acquire data of one raster line of a page to be printed. If NO in step S1001, the flow advances to step S1011 to end the series of operations.

After the data of one raster line is acquired from the page to be printed in step S1002, the flow advances to step S1003. It is determined in step S1003 whether a currently processed raster is the bottom raster of the page. If NO in step S1003, the raster is subjected to normal raster processing in step S1010 (to be described later), and the flow returns to step S1001.

On the other hand, if YES in step S1003, the flow advances to step S1004 to determine whether the target raster is a NULL raster. If YES in step S1004, the flow advances to step S1005 to output spool data. In step S1006, the NULL raster is output. In step S1006A, Null Counter is reset to 0, and the flow advances to step S1007. In step S1007, a page break code is output. In step S1007A, Line Counter is increased (incremented), and the flow returns to step S1001.

If NO in step S1004, the flow advances to step S1008 to spool the target raster. In this case, character split may occur, and thus output is skipped. In step S1009, the counter for a count of spool data rasters is increased (incremented), and the flow advances to step S1009A. In step S1009A, the lower end flag is changed to "TRUE", and the flow returns to step S1001. The main flow of the character split processing has been described.

[Normal Raster Processing: FIG. 8]

The above-mentioned normal raster processing in step S1010 of FIG. 7 will be described in detail with reference to FIG. 8. This processing is executed for rasters other than the bottom raster.

In step S2001, it is determined whether a target raster is a NULL raster. If YES in step S2001, the flow advances to step S2002 to determine whether the page break flag is "TRUE". If YES in step S2002, character split is to occur across the previous page and the current page. For this reason, a page break code is output in step S2003, and the flow advances to step S2004. In step S2004, the page break flag is changed to "FALSE", and the flow advances to step S2005. On the other hand, if NO in step S2002, the flow advances to step S2005 without any process.

It is determined in step S2005 whether there is spool data. If YES in step S2005, the flow advances to step S2006 to output spooled data. In the case of character split, the lower end portion of the previous page and the upper end portion of the current page are combined and output in this processing. In step S2007, Spool Counter which is a counter for a count of raster lines of spool data is cleared to 0, and the flow advances to step S2008. On the other hand, if NO in step S2005, the flow advances to step S2008 without any process. In step S2008, Null Counter is increased (incremented), and the processing ends.

On the other hand, if NO in step S2001, the flow advances to step S2009 to determine whether the immediately preceding raster is a NULL raster, the NULL raster constitutes a line spacing, and the lower end flag is "TRUE". This determination will be described later in detail.

If YES in step S2009, the flow advances to step S2010 to change the page break flag to "TRUE". After that, the flow advances to step S2010A. In step S2010A, the lower end flag is changed to "FALSE", and the flow advances to step S2011A. Note that in this embodiment, line spacing determination is not executed, and only the lower end flag is determined in step S2009, before the line spacing check amount data is increased to a certain extent. If the lower end flag=FALSE, the flow advances to step S2011; otherwise, the flow advances to step S2010.

If NO in step S2009, the flow advances to step S2011. In step S2011, the page break flag is changed to "FALSE", and the flow advances to step S2011A.

In step S2011A, it is determined whether Spool Counter=0. If NO in step S2011A, the flow advances to step S2014 without any process. If YES in step S2011A, the flow advances to step S2012. In step S2012, the line spacing check amount (to be described later) is updated, and the flow advances to step S2013. In step S2013, one or a plurality of NULL rasters (if a count of NULL rasters is 1, the NULL raster is directly output; otherwise, a signal corresponding to the plurality of NULL rasters is output using the value of Null Counter) are output. Null Counter is cleared to 0, and the flow advances to step. S2014. In step S2014, data is spooled, and the flow advances to step S2015. In step S2015, Spool Counter is increased, and the series of processing operations end. The normal raster processing has been described.

[Determination of Count of Plurality of Rasters Serving as Line Spacing: FIG. 9]

The processes in steps S2009 and S2012 in FIG. 8 will be described in detail with reference to FIG. 9. As described above, line spacing determination is based on a count of consecutive NULL raster lines. In some cases, consecutive NULL rasters do not constitute a line spacing. For example, NULL rasters occur consecutively because data contains consecutive white lines. For this reason, out of a plurality of sets of consecutive NULL rasters, one serving as a line spacing needs to be recognized. More specifically, a table containing counts of NULL rasters and the frequencies of occurrence of the groups of rasters is created, as shown in FIG. 9.

In the example shown in FIG. 9, as for the frequencies of occurrence, a group of 10 consecutive NULL rasters occurs once, a group of 11 consecutive NULL rasters occurs four times, and a group of 12 consecutive NULL rasters occurs five times. In text data such as email, line spacings are generally equal to each other, and only a single number of NULL rasters can be targeted (determined as a line spacing). However, when character data is rasterized to raster data, a digital error may occur. In consideration of this, line spacings can be represented by different numbers of NULL rasters.

Under the circumstances, in rasterizing the lower end portion of a page, a count of raster lines whose frequency of occurrence is the highest is used as a reference, and counts of raster lines close to the count are determined to be caused by a digital error. In this manner, a count of rasters serving as a line spacing is determined. For example, in the example of FIG. 9, a group of 13 lines occurs the most frequently, and thus the count of rasters (13 lines) is used as a reference raster count.

Counts of rasters in the neighborhood of the reference raster count are regarded as having errors. In the example of FIG. 9, a group of 14 lines occurs with low frequency and thus is eliminated from consideration. A group of 11 to 13 lines is determined as a line spacing. Since the number of samples increases along with an increase in the number of pages, the reference raster count is successively updated. The processes in steps S2009 and S2012 (recognition of line spacings and update of the line spacing check amount in FIG. 9) have been described. These processes can realize line spacing recognition.

With the above-mentioned processing (FIGS. 7 and 8), coping with character split, i.e., a process of preventing character split (FIG. 5) can be executed by printing, on the next page, data to be printed at the lower end portion of a page, even when character split is expected to occur (FIG. 4).

This processing exerts its effect in printing printing data which is not bound by the concept of page such as a Web page, using a printing apparatus which prints printing data having layout information such as a page break code at most. Among others, the processing is highly effective in printing an image which is not bound by the concept of page like email and in which character lines are arranged at regular line spacings.

Note that the processing in the embodiment has been described in terms of a printing control apparatus. A line being processed by a printing control apparatus according to the present invention is not necessarily the same as a line being printed by an actual printing apparatus. This is because a buffer for several lines is provided on the side of a printing control apparatus or printing apparatus to smooth out a time required for processing or transfer and not to interfere with printing.

Note that the above-mentioned processing is merely an example. The present invention is characterized by the following control. More specifically, when a printing apparatus is to consecutively print images on a plurality of printing media, it is determined whether there is an image which is to lie across the plurality of printing media. If the determination result shows that there is an image which is to lie across the plurality of printing media, a page break is inserted, and the image which is to lie across the plurality of printing media is printed on the next page. Such processing other than the above-mentioned processing is also included in this embodiment.

Figure 11A:
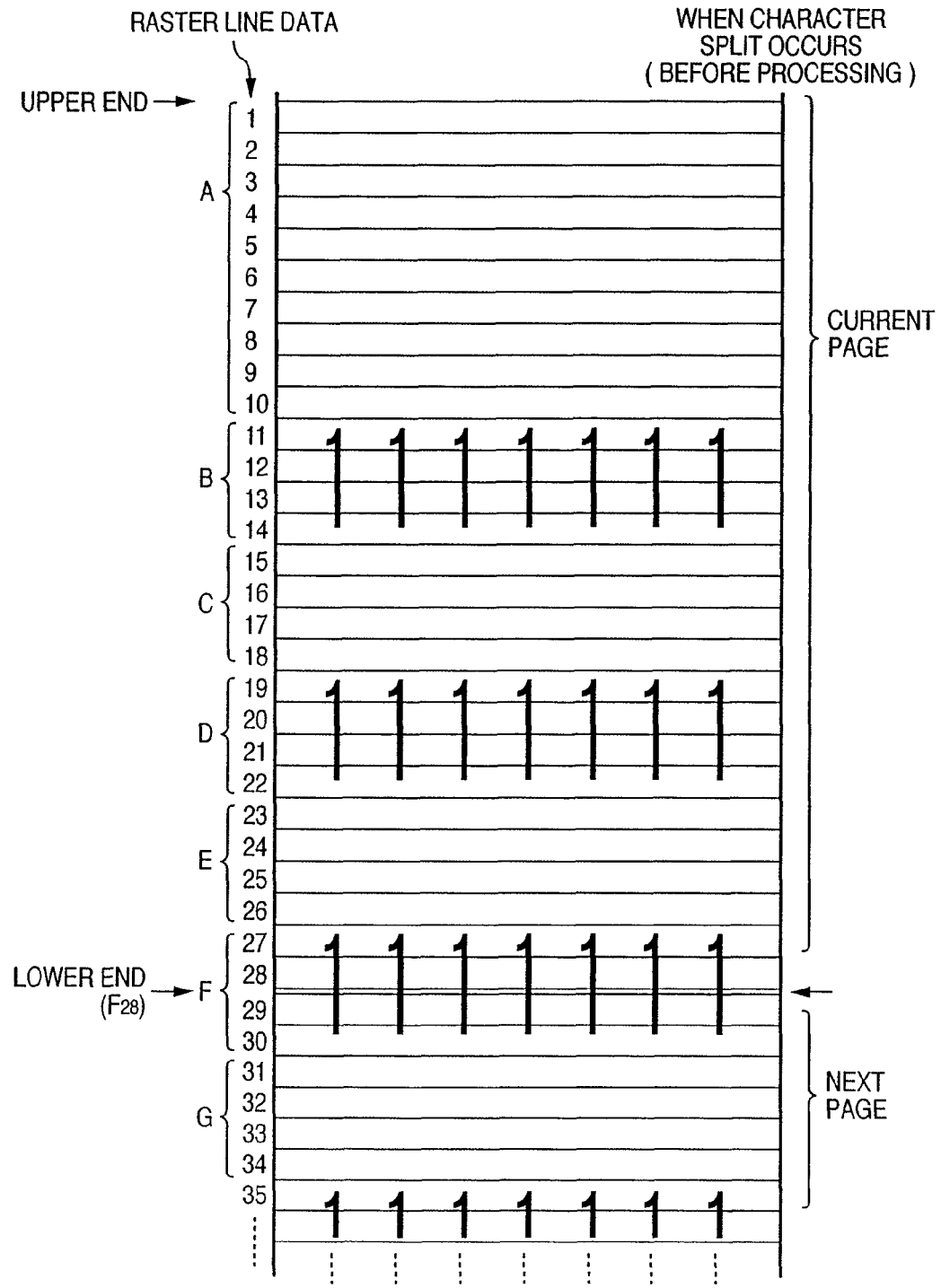
FIG. 11A is a view showing an example of a print result (character split) before the character split processing by the printing control apparatus according to the present invention.

[Explanation Using Specific Example: FIG. 11A]

Figure 12:
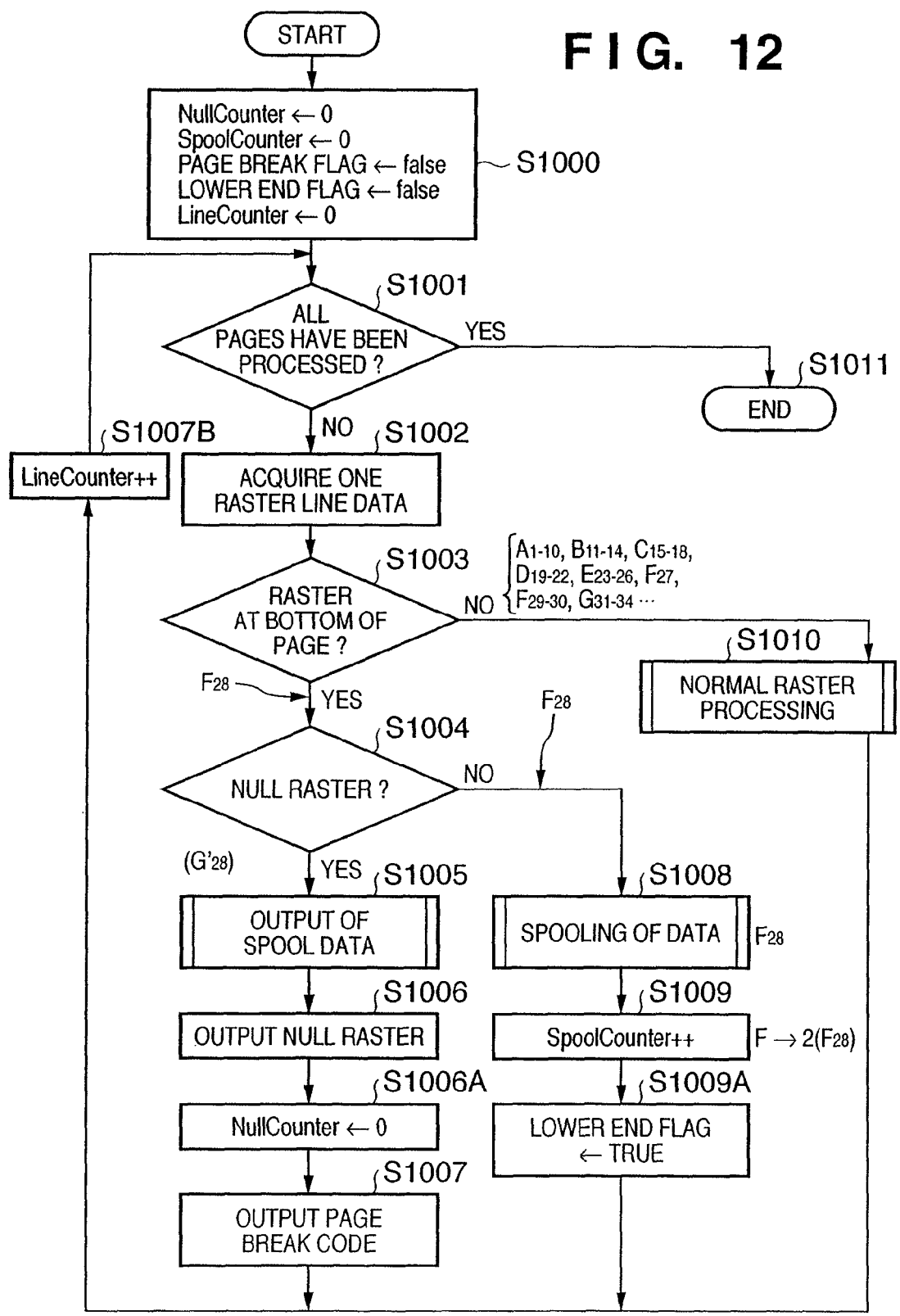
FIG. 12 is a flowchart showing a specific example of the character split processing in FIG. 11A.
Figure 13:
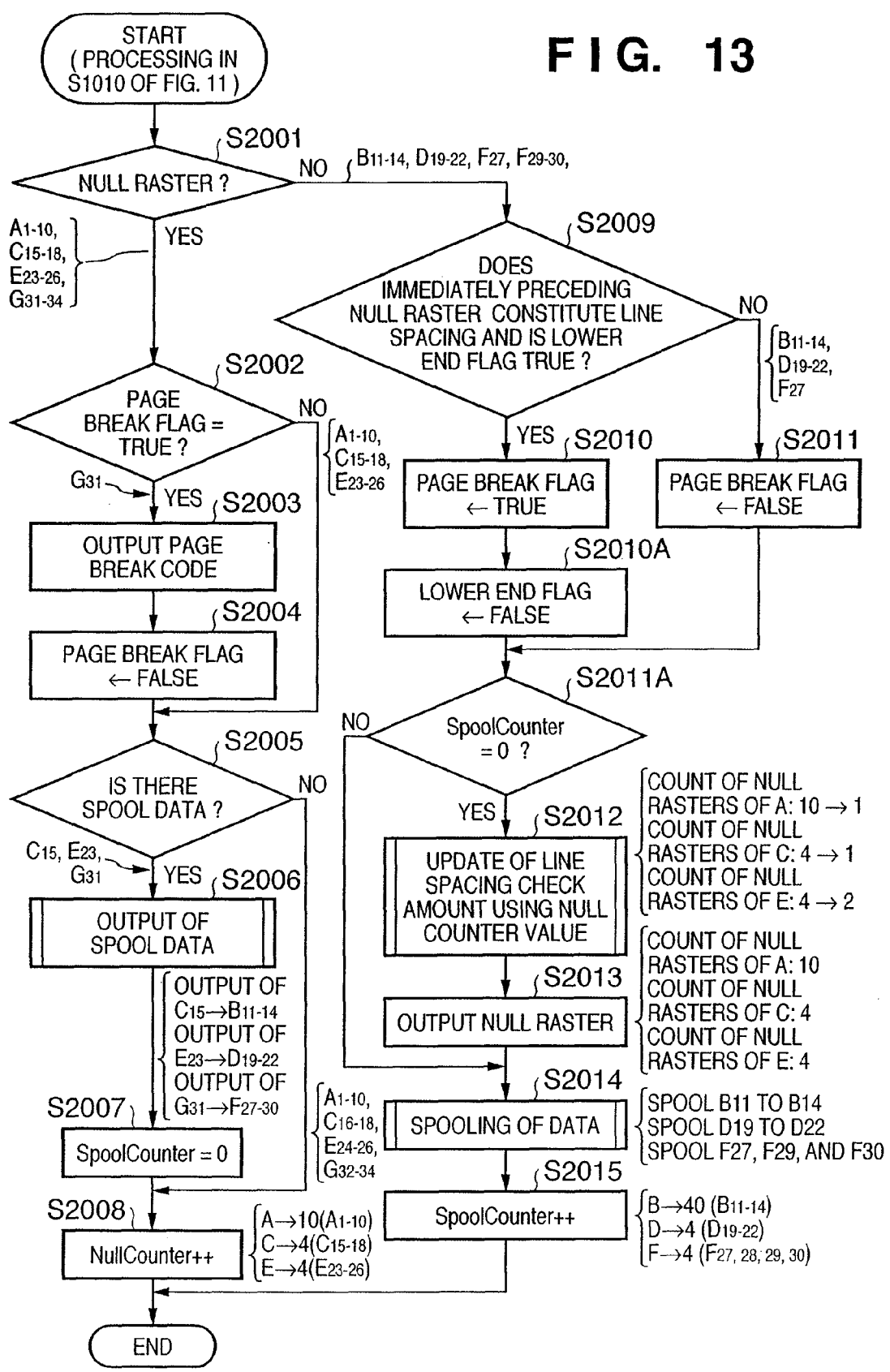
FIG. 13 is a flowchart showing a specific example of the character split processing in FIG. 11A.

The contents described with reference to FIGS. 7 and 8 will be supplemented with reference to FIGS. 12 and 13 using a specific example in FIG. 11A. To explain the processes in FIGS. 12 and 13 using the specific example of FIG. 11A (corresponding to FIGS. 7 and 8), processing after counts of NULL rasters are accumulated in the line spacing check amount table shown in FIG. 9 will be described as an example for the descriptive simplicity. Note that in this embodiment, line spacing determination is not executed, and only the lower end flag is determined in step S2009, before the line spacing check amount data is increased to a certain extent. If the lower end flag=FALSE, the flow advances to step S2011, otherwise, the flow advances to step S2010.

FIG. 11A shows a case wherein raster line data 1 to 28 are printed in the printable area of a predetermined page of a printing medium, and raster line data 29 and subsequent raster line data are printed in the printable area of a page next to the predetermined page. Reference symbols A1 to A10 denote NULL raster line data which do not constitute a line spacing. Reference symbols B11 to B14, D19 to D22, and F27 to F30 denote raster line data which represent characters. Reference symbols C15 to C18, E23 to E26, and G31 to G34 denote NULL raster line data which constitute line spacings. Reference symbol F28 denotes the bottom of the printable area of the current page; and F29, the top of the printable area of the next page.

Figure 11B:
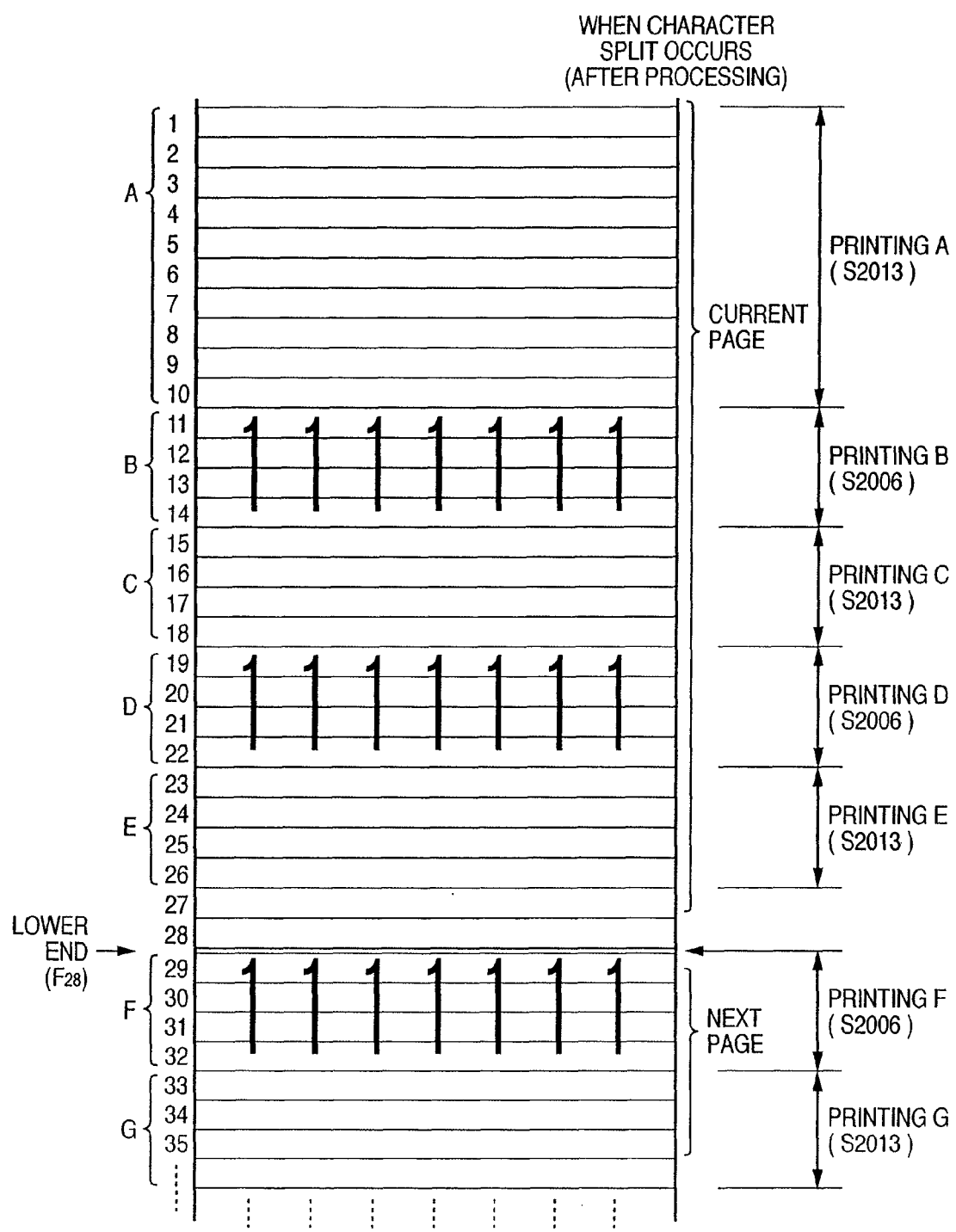
FIG. 11B is a view showing an example of a print result (elimination of character split) after the character split processing by the printing control apparatus according to the present invention.

If character data lies across the bottom of the printable area of the current page and the top of the printable area of the next page, the above-mentioned character split processing can print the data F27 and F28 in FIG. 11A from the upper end, as shown in FIG. 11B. Thus, printing can be executed without character split. Note that a case without character split can be handled by the processes shown in FIGS. 12 and 13.

[Flow of Character split Processing in FIG. 11A: FIGS. 12 and 13]

The procedure for the character split processing will be described in a specific manner with reference to FIGS. 12 and 13.

As for the raster line data A1 to A10 (which do not constitute a line spacing), the flow advances in the following order: step S1000 in FIG. 12→step S1001→step S1002→step S1003→step S1010→step S2001 in FIG. 13→step S2002→step S2005→step S2008. This sequence is repeated, and Null Counter reaches 10.

As for the raster line data B11 (beginning of character), the flow advances in the following order: step S1002 in FIG. 12→step S1003→step S1010→step S2001 in FIG. 13→step S2009→step S2011→step S2011A→step S2012→step S2013→step S2014→step S2015. The line spacing check amount is updated using Null Counter (=10), and NULL raster line data (the amount corresponding to Null Counter (=10)) are output. The raster line data B11 is spooled, and Spool Counter is set to 1. As for the raster line data B12 to B14 (character), the flow advances in the following order: step S1002 in FIG. 12→step S1003→step S1010→step S2001 in FIG. 13→step S2009→step S2011→step S2011A→step S2014→step S2015. This sequence is repeated. The raster line data B12, B13, and B14 are sequentially spooled, and Spool Counter is increased (2→3→4).

As for the raster line data C15 (beginning of line spacing), the flow advances in the following order: step S1002 in FIG. 12→step S1003→step S1010→step S2001 in FIG. 13→step S2002→step S2005→step S2006 (the spool data B11 to B14 are output)→step S2007→step S2008. As for the raster line data C16 to C18 (line spacing), the flow advances in the following order: step S1002 in FIG. 12→step S1003→step S1010→step S2001 in FIG. 13→step S2002→step S2005→step S2008. Null Counter reaches 4.

As for the raster line data D19 (beginning of character), the flow advances in the following order: step S1002 in FIG. 12→step S1003→step S1010→step S2001 in FIG. 13→step S2009→step S2011→step S2011A→step S2012→step S2013→step S2014→step S2015. The line spacing check amount is updated using Null Counter (=4). NULL raster line data (the amount corresponding to Null Counter (=4)) are output. The raster line data D19 is spooled, and Spool Counter is set to 1. As for the raster line data D20 to D22 (character), the flow advances in the following order: step S1002 in FIG. 12→step S1003→step S1010→step S2001 in FIG. 13→step S2009→step S2011→step S2011A→step S2014→step S2015. This sequence is repeated. The raster line data D20, D21, and D22 are sequentially spooled, and Spool Counter is increased (2→3→4).

As for the raster line data E23 (beginning of line spacing), the flow advances in the following order: step S1002 in FIG. 12→step S1003→step S1010→step S2001 in FIG. 13→step S2002→step S2005→step S2006 (the spool data D19 to D22 are output)→step S2007→step S2008. As for the raster line data E24 to E26 (line spacing), the flow advances in the following order: step S1002 in FIG. 12→step S1003→step S1010→step S2001 in FIG. 13→step S2002→step S2005→step S2008. This sequence is repeated, and Null Counter reaches 4.

As for the raster line data F27 (beginning of character), the flow advances in the following order: step S1002 in FIG. 12→step S1003→step S1010→step S2001 in FIG. 13→step S2009→step S2011→step S2011A→step S2012→step S2013→step S2014→step S2015. The line spacing check amount is updated using Null Counter (=4). NULL raster line data (the amount corresponding to Null Counter (=4)) are output. The raster line data F27 is spooled, and Spool Counter is set to 1. As for the raster line data F28 (character: at the bottom), the flow advances in the following order: step S1002 in FIG. 12→step S1003→step S1004→step S1008→step S1009→step S1009A. The raster line data F28 is spooled, and Spool Counter is increased to 2. The lower end flag is changed to "TRUE". As for the raster line data F29 (character: at the top of the next page), the flow advances in the following order: step S1002 in FIG. 12→step S1003→step S1010→step S2001 in FIG. 13→step S2009 step S2010→step S2010A→step S2011A→step S2012→step S2013→step S2014→step S2015. The page break flag is changed to "TRUE", and the lower end flag is reset to "FALSE". The raster line data F29 is spooled, and Spool Counter is increased to 3. As for the raster line data F30 (character), the flow advances in the following order: step S1002 in FIG. 12→step S1003→step S1010→step S2001 in FIG. 13→step S2009→step S2011→step S2011A→step S2014→step S2015. The raster line data F30 is spooled, and Spool Counter is increased to four.

As for the raster line data G31 (beginning of line spacing), the flow advances in the following order: step S1002 in FIG. 12→step S1003→step S1010→step S2001 in FIG. 13→step S2002→step S2003→step S2004→step S2005→step S2006 (the spool data F27 to F30 are output)→step S2007→step S2008. As for the raster line data G32 to G34 (line spacing), the flow advances in the following order: step S1002 in FIG. 12→step S1003→step S1010→step S2001 in FIG. 13→step S2002→step S2005→step S2008. This sequence is repeated, and Null Counter reaches 4. The subsequent processing will be omitted.

As described above, the character split processing can print the data F27 and F28 in FIG. 11A from the upper end, as shown in FIG. 11B. Thus, printing can be executed without character split.

Figure 11C:
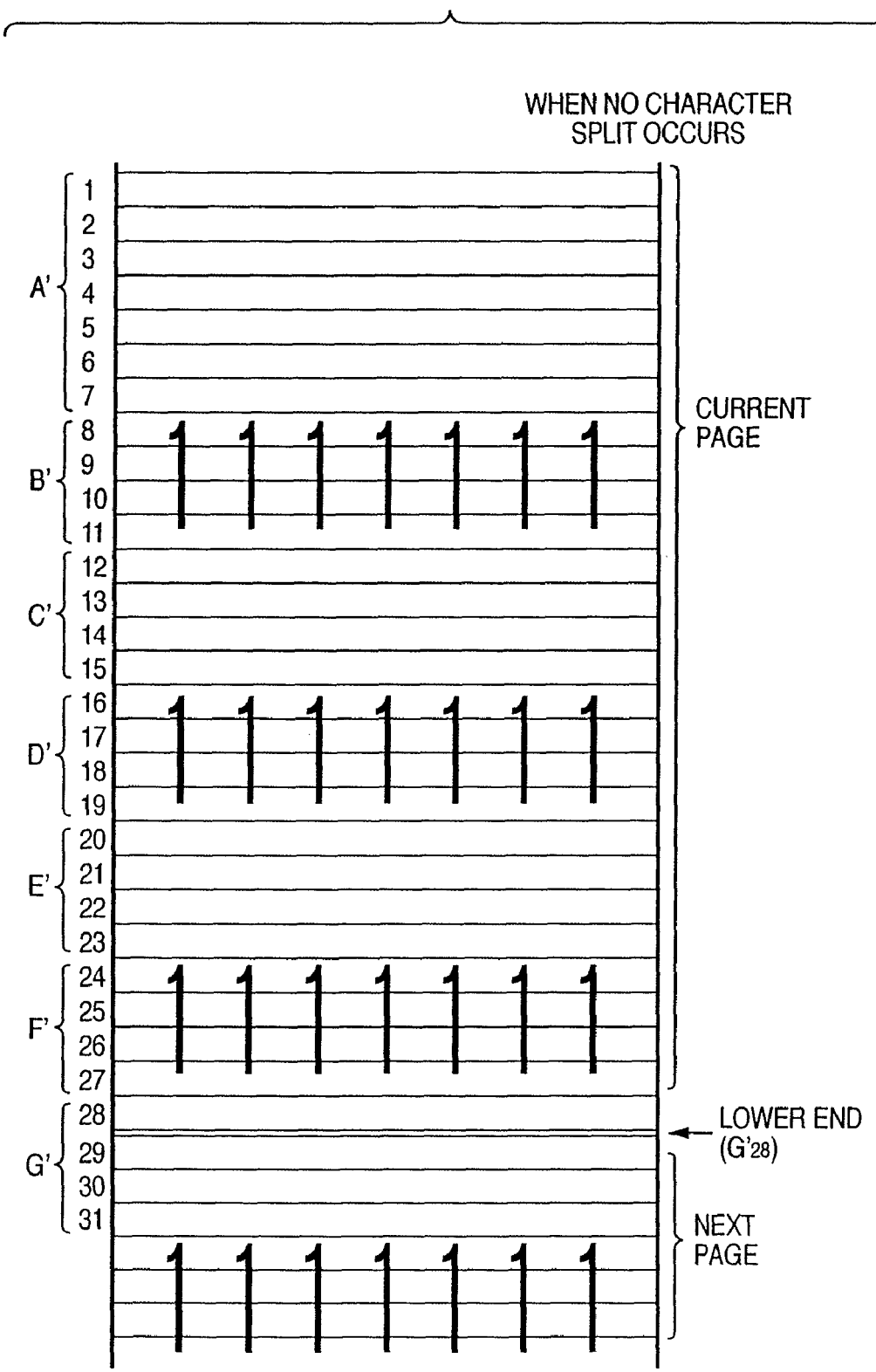
FIG. 11C is a view showing an example of a print result (no character split) before the character split processing by the printing control apparatus according to the present invention.

In the character split processing, if no character split occurs, as shown in G'28 of FIG. 11C, processing for G'28 is executed instead of the above-mentioned processing for F28. More specifically, the flow advances in the following way: step S1002 in FIG. 12→step S1003→step S1004→step S1005→step S1006→step s1006A→step S1007. Spool data and a NULL raster are output. Null Counter is reset to 0, and a page break code is output.

Figure 10:
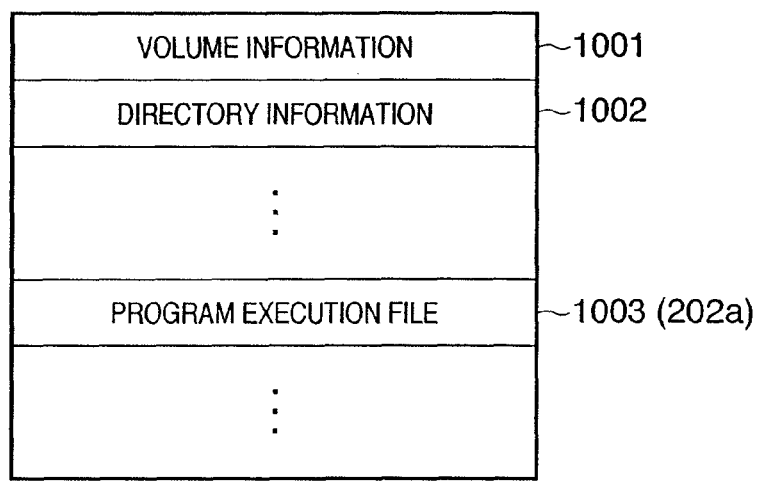
FIG. 10 is an explanatory view showing an example of the arrangement of the contents of a storage medium storing a program according to the present invention.

[Arrangement Example of Contents of Storage Medium: FIG. 10]

FIG. 10 is an explanatory view showing an example of the arrangement of the contents of a storage medium storing a control program (a program execution file 1003) for controlling character split according to the present invention. A storage medium according to the present invention comprises contents such as volume information 1001, directory information 1002, and the program execution file 1003 and is stored in the ROM 311, storage area 202, or the like. The operation of the printing control apparatus according to the embodiment has been described.

Other Embodiment

The embodiment of the present invention has been described above. The present invention can also be applied to a case without a line spacing determination table. More specifically, the present invention can be applied to a case wherein in the flow upon occurrence of character split in FIG. 12 and 13, only lower end flag determination (whether the lower end flag is TRUE) is executed in step S2009 (without the line spacing determination table, steps S2012 and S2013 are skipped). The details of the case will be omitted because the case is obtained by omitting a portion that pertains to line spacing determination from the description with reference to FIGS. 12 and 13.

In this case, it is determined whether a raster line at the bottom of a page is null or includes a black portion. If the raster line includes a black portion, it is determined whether the next line, i.e., the top line on the next page is null or includes a black portion. That is, if it is determined that black portions consecutively exist across the pages, a page break is inserted before the bottom line of the page.

Note that the present invention can be implemented as an apparatus, method, program, storage medium, or the like. More specifically, the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiment to the system or apparatus, and reading out and executing the program code stored in the storage medium by a computer (or a CPU or MPU) of the system or apparatus.

In this case, the program code itself read out from the storage medium implements the functions of the above-mentioned embodiment, and the storage medium which stores the program code constitutes the present invention.

The functions of the above-mentioned embodiment may be implemented not only by executing the readout program code by the computer but also by some or all of actual processing operations executed by an operating system (OS) running on the computer on the basis of an instruction of the program code.

Furthermore, the functions of the above-mentioned embodiment may be implemented by some or all of actual processing operations executed by a CPU or the like arranged in a function extension card or a function extension unit, which is inserted in or connected to the computer, after the program code read out from the storage medium is written in a memory of the extension card or unit.

Figure 8:
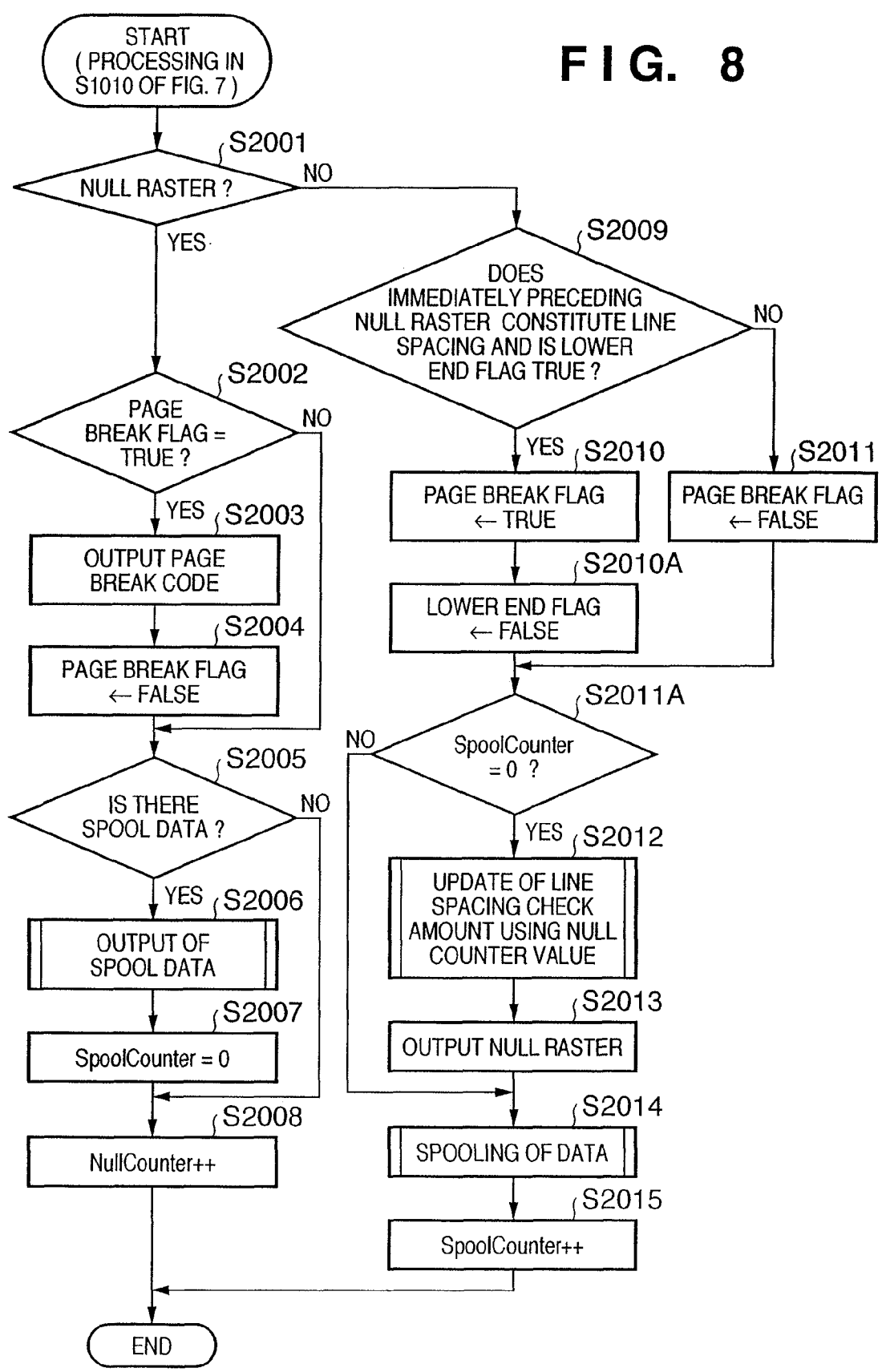
FIG. 8 is a flowchart showing the character split processing by the printing control apparatus according to the present invention.

If the present invention is applied to the above-mentioned storage medium, a program for implementing the processes described with reference to FIGS. 7 and 8 is stored in the storage medium.

As has been described above, a printing control apparatus according to the embodiment of the present invention checks continuity between data which is to be printed at the lower end portion of a page and data which is to be printed at the upper end portion of the next page, in data across pages on which consecutive images are printed. If there is continuity, a page break is inserted before the data at the lower end portion of the page, and an image of the data at the lower end portion is printed on the next page. With this operation, character split due to printing across pages, as shown in FIG. 11A, can be prevented, and a print result shown in FIG. 11B can be obtained.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2003-373183 filed on Oct. 31, 2003 and 2004-273974 filed on Sep. 21, 2004, which are hereby incorporated by reference herein.

What is claimed is:

1. An information processing apparatus functioned as a host computer for outputting print data divided into a plurality of raster lines to a print apparatus, comprising:
a print data storage unit constructed to store the plurality of raster lines;
an output unit constructed to output the plurality of raster lines stored in said print data storage unit to the print apparatus;
a bottom determination unit constructed to determine whether or not a current raster line is at a bottom of a printable area in which the print apparatus prints the raster lines;
a null line determination unit constructed to determine whether or not the current raster line is a null raster line;
a bottom information storage unit constructed to store bottom information indicating the bottom of the printable area; and
a page break information storage unit constructed to store page break information indication a page break,
wherein a current raster line is stored in said print data storage unit when said bottom determination unit determines that the current raster line is not the bottom of the printable area and said null line determination unit determines that the current raster line is not a null line,
wherein, as output processing when character split processing has not occurred, the plurality of raster lines stored in said print data storage unit are output to the print apparatus and after outputting the plurality of raster lines stored in said print data storage unit, a page break code is output to the print apparatus when said bottom determination unit determines that the current raster line is the bottom of the printable area and said null line determination unit determines that the current raster line is a null line,
wherein the current raster line is stored in said print data storage unit and the bottom information is stored in said bottom information storage unit when said bottom determination unit determines that the current raster line is the bottom of the printable area and said null line determination unit determines that the current raster line is not a null line,
wherein the current raster line is stored in said print data storage unit and the page break information is stored in said page break information storage unit when said bottom determination unit determines that the current raster line is not the bottom of the printable area, said null line determination unit determines that the current raster line is not a null line, and said bottom information storage unit stores the bottom information, and
wherein, as output processing when character split processing has occurred, a page break code is output to the print apparatus and after outputting the page break code, the plurality of raster lines stored in said print data storage unit are output to the print apparatus when said bottom determination unit determines that the current raster line is not the bottom of the printable area, said null line determination unit determines that the current raster line is a null line, and said page break bottom information storage unit stores the page storage information.

2. The information processing apparatus according to claim 1, further comprising a line spacing determination unit constructed to determine whether the null raster line determined by said null line determination unit constitutes a line spacing between character lines,
wherein the current raster line is stored in said print data storage unit and the page break information is stored in said page break information storage unit when said bottom determination unit determines that the current raster line is not the bottom of the printable area, said null line determination unit determines that the current raster line is not a null line, said line spacing determination unit determines that a raster line immediately before the current raster line is the line spacing, and said bottom information storage unit stores the bottom information.

3. A method of outputting print data divided into a plurality of raster lines to a print apparatus in an information processing apparatus functioned as a host computer, comprising the steps of:
storing the plurality of raster lines into a print data storage unit;
outputting the plurality of raster lines stored in said print data storage unit to the print apparatus;
determining whether or not a current raster line is at a bottom of a printable area in which the print apparatus prints the raster lines;
determining whether or not the current raster line is a null raster line;
storing bottom information indicating the bottom of the printable area into a bottom information storage unit; and
storing page break information indication a page break in a page break information storage unit,
wherein a current raster line is stored in said print data storage unit when it is determined that the current raster line is not the bottom of the printable area and it is determined that the current raster line is not a null line,
wherein, as output processing when character split processing has not occurred, the plurality of raster lines stored in said print data storage unit are output to the print apparatus and after outputting the plurality of raster lines stored in said print data storage unit, a page break code is output to the print apparatus when said bottom determination unit determines that the current raster line is the bottom of the printable area and said null line determination unit determines that the current raster line is a null line,
wherein the current raster line is stored in said print data storage unit and the bottom information is stored in said bottom information storage unit when it is determined that the current raster line is the bottom of the printable area and it is determined that the current raster line is not a null line,
wherein the current raster line is stored in said print data storage unit and the page break information is stored in said page break information storage unit when it is determined that the current raster line is not the bottom of the printable area, it is determined that the current raster line is not a null line, and the bottom information is stored in said bottom information storage unit, and wherein, as output processing when character split processing has occurred, a page break code is output to the print apparatus and after outputting the page break code, the plurality of raster lines stored in said print data storage unit are output to the print apparatus when it is determined that the current raster line is not the bottom of the printable area, it is determined that the current raster line is a null line, and the page storage information is stored in said page break bottom information storage unit.

4. The method according to claim 3, further comprising a step of determining whether the null raster line determined in said null line determination step constitutes a line spacing between character lines, wherein the current raster line is stored in said print data storage unit and the page break information is stored in said page break information storage unit when it is determined that the current raster line is not the bottom of the printable area, it is determined that the current raster line is not a null line, it is determined that a raster line immediately before the current raster line is the line spacing, and the bottom information is stored in said bottom information storage unit.

5. A non-transitory computer-readable storage medium which stores a program causing a computer to execute a method according to claim 3.

* * * * *